April 18, 1967 — A. LYSHOLM — 3,314,598
SCREW ROTOR MACHINE
Filed May 3, 1966 — 5 Sheets-Sheet 1

3,314,598
SCREW ROTOR MACHINE
Alf Lysholm, Karlaplan 11, Stockholm, Sweden
Filed May 3, 1966, Ser. No. 547,383
Claims priority, application Sweden, May 10, 1965,
6,077/65
4 Claims. (Cl. 230—143)

The present invention relates to a screw rotor machine of the general kind disclosed for instance in Swedish Patent No. 108,467 and the United States Patent No. 2,622,787. Rotor machines of this kind have a male rotor and a female rotor formed with helical lobes. The male lobes engage the helical grooves formed between the female lobes, and the rotors seal relative one another and relative to the surrounding housing. Such a screw rotor machine may operate as a screw compressor or as a screw turbine.

In rotor machines under consideration the leakage along the sealing lines indicated above is of decisive importance for obtaining a high thermodynamic efficiency, particularly at high pressures. Therefore, one object of the invention is to provide a male profile and a corresponding female profile which enables a reduction of the leakage losses as far as possible.

In the art of screw rotor machines under consideration it is previously known to form the lobes of the male rotor with a profile which results in a relatively thick lobe which gives relatively thin lobes of the female rotor, particularly when the number of lobes is relatively great. In screw compressors for low pressures the thin female lobes will not involve any disadvantage of substantial importance, but when high pressures are required the number of lobes must be at least four male lobes and at least six female lobes. The thickness of the female lobes is then reduced to such an extent that when heated they will be subjected to elastic deformations resulting in a reduced safety of operation.

In screw turbines operating with a motive fluid of high temperature it is further required that heat can be effectively transmitted from the lobes and this requires also that the thickness of the female lobes must not be too small.

Among hitherto known profiles for machines under consideration there is one which has been used for a long time and which is a true or somewhat modified circular arc profile giving a relatively thick male lobe. However, this profile requires that the male rotor is given a relatively great inner diameter in order not to obtain too thin female lobes. Such a profile will result in a reduction of the displacement volume which is not desired.

When the male lobes and the grooves between the female lobes have a circular arc profile the sealing line will be short but this will also result in the formation of a so called blow hole of the kind described in detail in U.S. Patent No. 2,622,787. Such a blow hole will result in a considerable increase of the leakage losses because the area of the blow hole is greater than the sealing area between the rotors.

In the U.S. patent referred to above another type of profile having generated lobe flanks is analysed but this profile will result in longer sealing lines. However, there are also formed so called pockets located between the flank faces of the grooves of the female rotor and the male lobes. The volume of these pockets will vary upon rotation of the rotors.

At known generated lobe profile flanks the female profile is generated by a point defining the end of the respective lobe profile flank of the male rotor, said point being located on the top circle, and the lobe profile of the male rotor is generated substantially by the point of intersection between the pitch circle of the female rotor and the lobe profile flank of the female rotor.

Rotors formed to cooperate in the manner described above have no blow hole but instead there are formed the pockets referred to above. The size of these pockets depends on the selected thickness of the lobe or on the profile height of the male lobe.

The general object of the present invention is therefore to obtain an optimum between the above mentioned profile forms, that is a compromise profile which besides reduced leakage losses enables an increase of the width of the female lobes without the necessity of increasing the inner diameter of the male profile. In comparison with a corresponding circular arc profile lobe the compromise profile according to the invention permits a considerable increase of the displacement volume of the screw rotor machine.

The above indicated object is obtained by means of substantially symmetrical profiles of the cams and grooves of the rotors, said profiles being referred each to its coordinate system and following the helical form of the respective lobe. According to the invention, a screw rotor machine having at least four male lobes and at least six female lobes is characterized by the fact that the profile of the respective male lobe has a ratio $b/h$ less than one, where $b$ is the length of the tangent to the pitch circle of the male rotor between the symmetry axis of the respective lobe ($x$-axis) and either of the profile flanks and $h$ is the height of the lobes along the respective symmetry axis from the pitch circle of the male rotor, and that the profile forms of cooperating rotors are formed by selecting one or more curves joining the top circle of the male rotor on both sides of the respective $x$-axis of the lobes and satisfying the function $y_M = f(x_M)$, and that this curve upon rotation of the rotors has successively generated the groove profile of the female rotor to form a curve satisfying the function $y_F = f(x_F)$, the connection of the last mentioned curve to the outer periphery of the female rotor with a selected curve $y_F = g(x_F)$ in turn having generated the rest portion of the male lobe flank.

Depending on the choice of addendum of the female rotor the transition from the groove profile to the outer connecting curve $y_F = g(x_F)$ may coincide with the point of intersection of the groove profile with the pitch circle of the female rotor but this is, however, no necessary requirement.

Two cooperating and interengaging rotors according to the invention will reduce the area of the blow hole in relation to that blow hole which is obtained for circular arc profiles, and the size of the pockets may be adapted to a magnitude which is suitable for obtaining the object according to the invention. The curve selected for the top portion of the male lobe profile will as a whole generate the groove profile of the female rotor by means of a generating point successively moving along said curve upon rotation of the rotors, and as a result thereof better sealing conditions and less risk of wearing will be obtained for cooperating rotor portions.

For screw turbines a further advantage is derived from the invention in that it will be possible to direct cooling air into the pockets formed between the rotors in order to reduce the heat transfer to the rotors. Such pockets may be made relatively great in order to enable an effective cooling, such pockets having no noteworthy influence on the total leakage loss. With a cooperation of the rotors in accordance with the invention there is obtained as mentioned above a considerably smaller blow hole which particularly in screw turbines is of greatest importance because the hot gas flow leaking therethrough will be reduced in a corresponding degree.

Some suitable embodiments of the invention are shown by way of example in the annexed drawings.

FIG. 1 shows a male rotor engaging a corresponding female rotor, and a theoretical and a practical circular arc profile being also shown in this figure by dotted lines for the sake of comparison.

FIG. 2 shows on an enlarged scale the male lobe profile according to the invention as shown in FIG. 1 and in this figure is also drawn an approximative form for a selected circle function on the upper portion of the flank, said form replacing the generated portion of the male lobe flank. Fig. 2 also illustrates the difference between the flank profile according to the invention and a completely generated profile and a circular arc profile.

FIG. 3 shows a male lobe with the greater part of the lobe flank formed by a selected profile, and the practically possible form of the circular arc profile.

FIGS. 4 to 6 show embodiments of curves forming the upper male lobe flank and following the function $y_M = f(x_M)$, the various reference characters being denoted in this figure. In the examples shown relating to the circle, ellipse and parabola function respectively such values have been inserted which enable to exemplify the application of the general function for forming lobe profiles according to the invention.

The screw rotor machine according to the invention is intended for relatively high pressures when it is used as a compressor as well as when used as a screw turbine. In both cases the lobes are thus subjected to substantial deflections and also to heat expansions, which in screw turbines are considerable since the inlet temperature of the motive fluid is intended to be higher than 1000° C.

With respect to the high pressure ratio the number of male lobes is at least four and the number of female lobes at least six in the screw rotor machine according to the invention.

Figure 1:
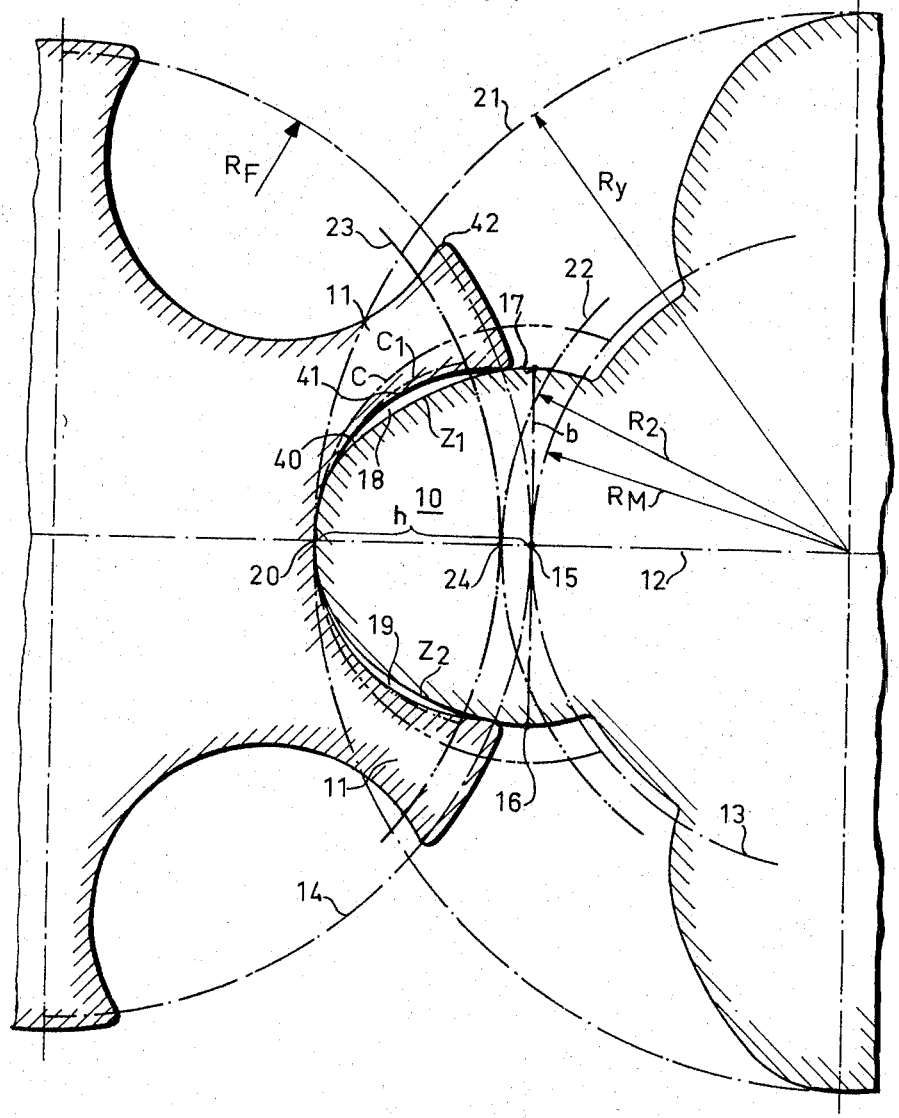
Figure 2:
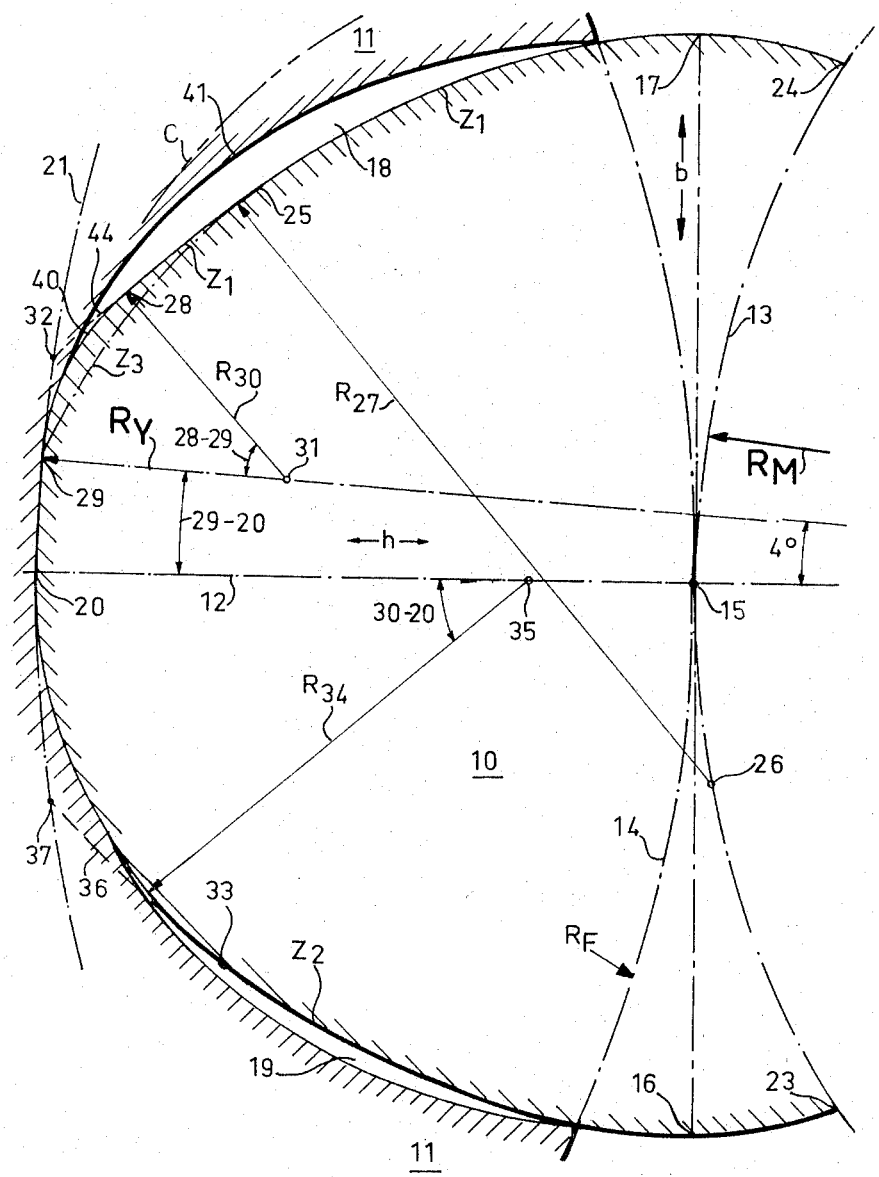

In FIGS. 1 and 2 there is shown a male lobe 10 in complete engagement between two female lobes 11. The male lobe profile according to the invention is denoted by Z and is substantially symmetrical relative to a middle line 12 extending between the centre of the pitch circle 13 having the radius $R_M$, and the centre of the pitch circle 14 of the female rotor having the radius $R_F$, said middle line intersecting the pitch circle at tangency point 15.

The difference between the flank $Z_1$ and the flank $Z_2$ shown in the figures is within the scope of the invention. However, this difference will result in that for one and the same lobe there are formed pockets 18 and 19 respectively of different size between the male lobe and the female lobe on each side relative to the middle line 12.

In FIG. 1, $b$ denotes the distance between the tangency point of the pitch circles and the point 16 or 17 on the respective male lobe flank and is the length of the tangent to the pitch circle of the male rotor between the symmetry axis (x-axis) of the respective lobe and either profile flank, and with the distance $h$ is denoted the profile height of the lobes along the respective symmetry axis from the pitch circle of the male rotor. According to the invention the ratio $b/h$ should be less than one and preferably have a value between 0.97 and 0.70. In FIG. 1 this ratio for the Z-profile is about 0.85.

The above mentioned ratio is obtained for the screw rotor machine according to the invention in that the upper portion of the respective male lobe 10 is formed by a curve 40 having the function $y_M = f(x_M)$ and being at each flank connected to the top circle 21 of the male rotor having the radius $R_Y$. The radius $R_k$ of the curve 40 may in each point of the curve be calculated with respect to its magnitude and direction in relation to a co-ordinate system coinciding with the symmetry axis of the respective male lobe. Corresponding values of $R_o$ $\alpha_k$ and $\beta_k$ indicated in FIGURES 4 to 6 are also obtained, these values being necessary for the calculation of the lobes.

Figure 4:
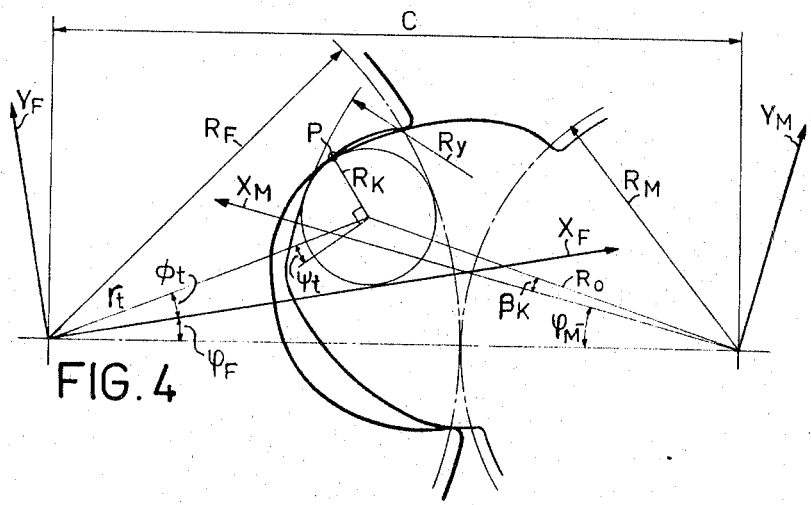
Figure 5:
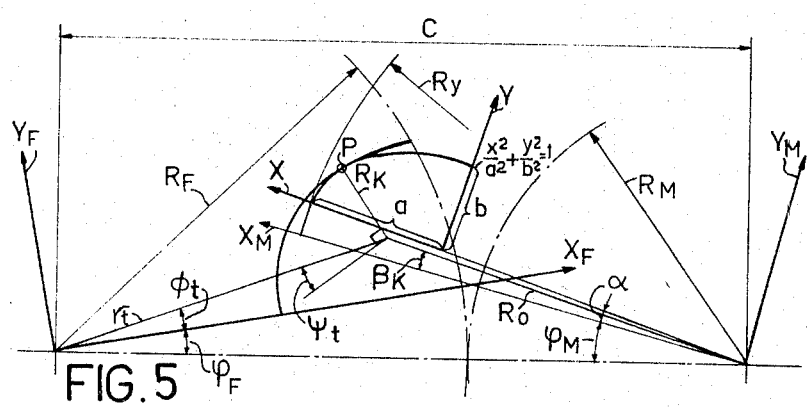
Figure 6:
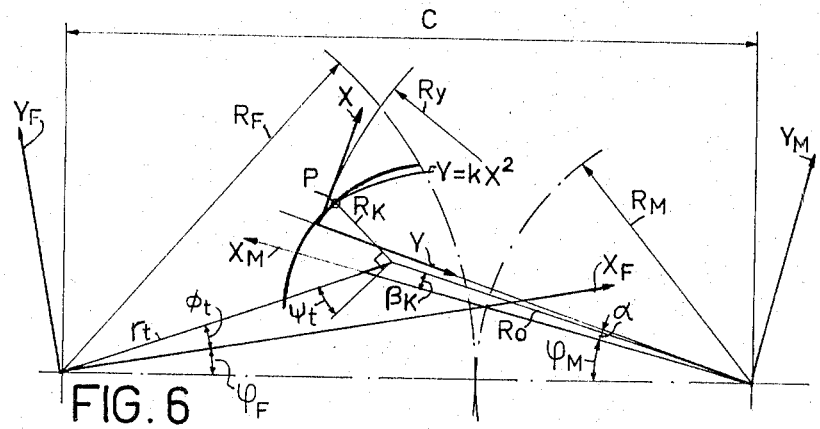
Figure 7:
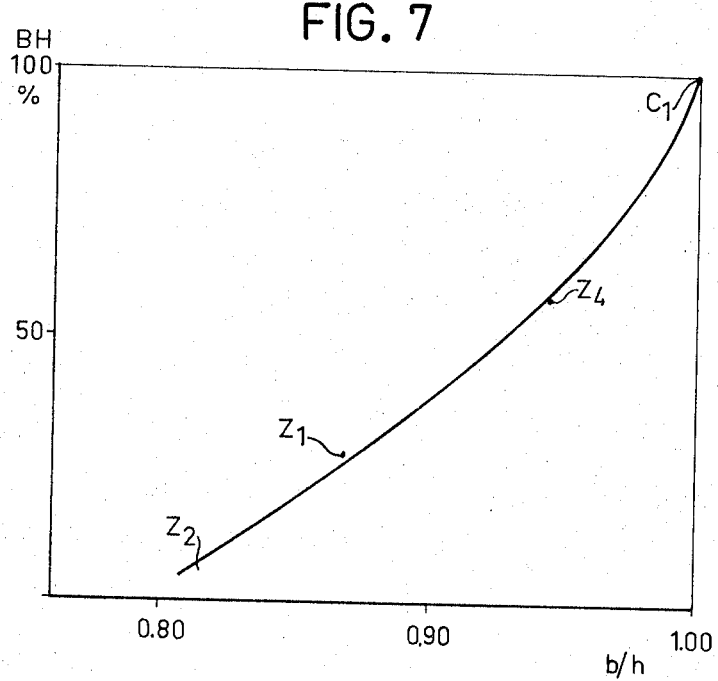
FIG. 7 illustrates the size of the blow hole for various profiles according to the invention as a function of the ratio $b/h$, the blow hole of the circular arc profile being set to 100% at a value of $b/h$ equal to one.
Figure 8:
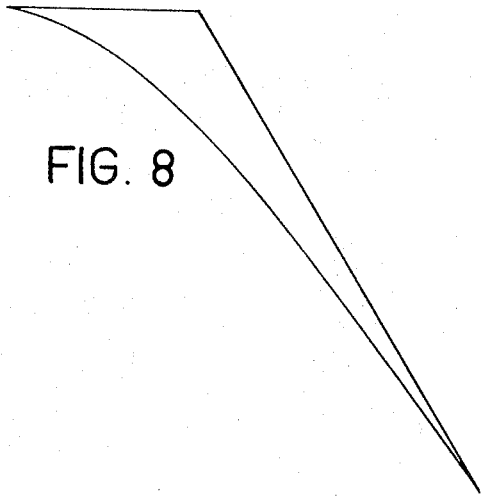
FIGS. 8 and 9 show the blow holes for the circular arc profile and the profile according to the invention shown in FIGURES 1 and 2.
Figure 9:

The selected curve 40 on the male lobe will upon the rotation of the rotors generate the groove profile of the female rotor to a curve 41 having the function $$y_F = f(x_F)$$

the following relationship being possible to state, based on the variables indicated in FIGURES 4 to 6 in order to define the groove profile of the female rotor.

(1) $\quad r_t = \sqrt{C^2 + R_o^2 - 2CR_o \cos(\varphi_M + \beta_k)}$ (2) $\quad \phi_t = \arcsin \dfrac{R_o \sin(\varphi_M + \beta_k)}{r_t} - \varphi_F$ (3) $\quad \psi_t = \operatorname{arctg}\left[\dfrac{r_t^2}{CR_o \sin(\varphi_M + \beta_k)}\right.$
$\left.\left(\dfrac{R_o[r_t^2 \cos(\varphi_M + \beta_k) - CR_o \sin^2(\varphi_M + \beta_k)]}{r_t^2[C - R_o \cos(\varphi_M + \beta_k)]} - \dfrac{R_M}{R_F}\right)\right]$ In the generating point, that is when a point $p$ on the curve $y_M = f(x_M)$ also is on the curve $y_F = f(x_F)$ the following equation is given (4) $\quad \varphi_M = \dfrac{\pi}{2} - \alpha_k - \varphi_F - \psi_t - \phi_t$ and thereafter the co-ordinate values for the female lobe profile may be calculated from the equations (5) $\quad x_F = r_t \cos \phi_t - R_K \sin(\psi_t + \phi_t)$
(6) $\quad y_F = r_t \sin \phi_t + R_K \cos(\psi_t + \phi_t)$ $\Big\} y_F = f(x_F)$ The above method of calculation may be employed for differently selected functions $y_M = f(x_M)$ and FIGURES 4 to 6 show the alternative forms of a male lobe 10 with a selected circle, ellipse or parabola function. For the circle function it is not necessary to use Equation 4 while here every point will satisfy.

For lobe profiles of screw rotor machines it is known to form the female lobes with an addendum and the male lobes with a corresponding dedendum, the transition zones from the lobe flanks to the addendum and the dedendum being as a rule shaped as curves. In FIG. 1 the transition portion from the groove profile 41 of the female rotor to a rounded curve 42 with the function $y_F = g(x_F)$ is so chosen that the transition point will coincide with the intersection point of the groove profile and of the pitch circle 14 of the female rotor. However, this is no necessary requirement since the transition point may be located as well outside said intersection point depending on the addendum selected for the female rotor.

The transition point and the joining curve 42 between the groove profile and the outer periphery of the female rotor will thereafter generate the rest portion of the male lobe flank, and calculation formulas may be defined in an analogous way as indicated above. Alternatively the dedendum of the male lobe 10 may be selected and this in turn will be utilised for generating the rounded outer curve of the female lobe 11.

For a lobe profile formed according to the invention for the cooperating rotors it is accordingly the choice of the curve 40 with the function $y_M = f(x_M)$ which will have the greatest influence on the final shape of the lobe profiles. With respect to the object of the invention to provide a lobe profile which enables a blow hole as well as pockets the curve is chosen in such a manner that the ratio $b/h$ will be less than one.

For the sake of comparison in FIG. 1 there has been drawn a theoretical circular arc profile C having the same pitch circle 13 as for the male lobe 10 according to the invention. This circular arc profile is, however, not usable for ordinary pressure ratios, because it gives too thin female lobes 11. In practice it is therefore necessary to employ a circular arc profile of the known form indicated by the line $C_1$. The pitch circle of the male rotor in this case is denoted by 22 and has a greater radius $R_2$ than the radius $R_1$ of the pitch circle 13. The correspondingly smaller pitch circle of the female rotor is denoted by 23. The circles 22 and 23 have a common point of tangency 24.

From FIG. 1 it will be understood that the circular arc profile $C_1$ will give a considerably smaller displacement volume than the profile Z according to the invention. At the end of this specification there is given tabulated values for various profiles and from these values it will also be evident that the profile according to the invention will further result in a considerably smaller blow hole and as a result thereof a reduced leakage. A smaller blow hole is also of greatest importance in screw turbines in order to avoid hot gas jet streams.

Figure 3:
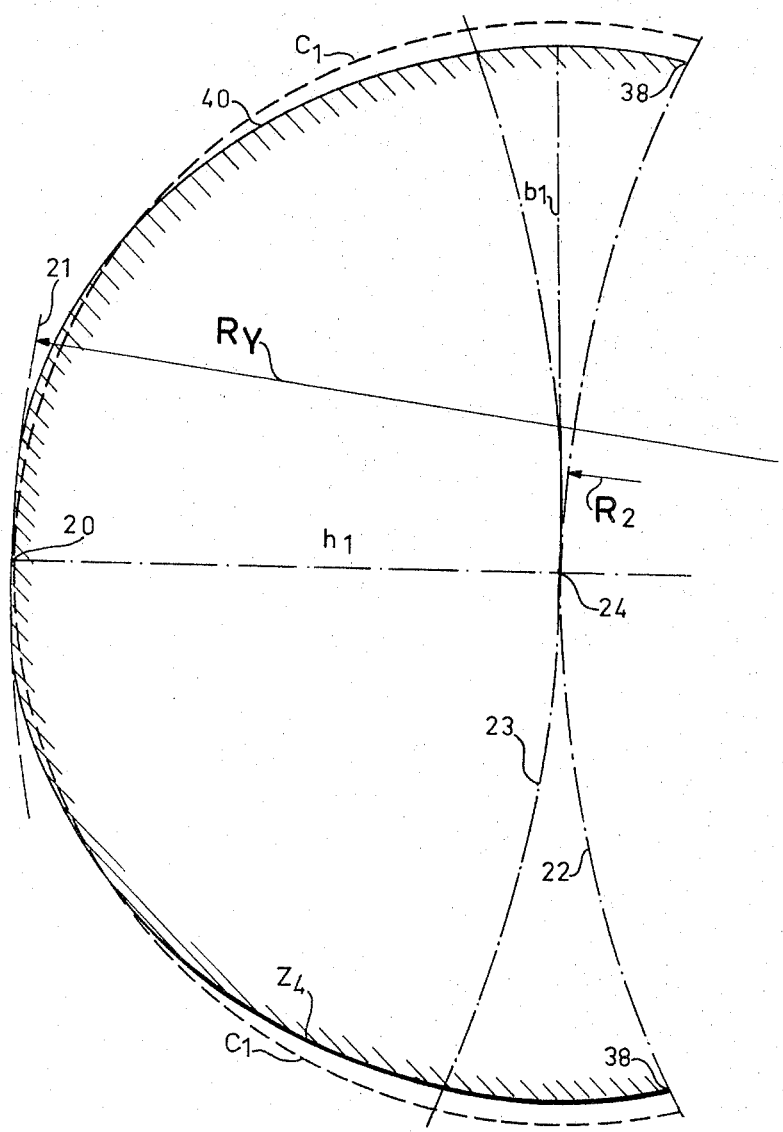

In order to more clearly explain which modifications of the form of the male lobe profile fall within the scope of the invention, reference is given to the profiles shown on an enlarged scale in FIGURES 2 and 3 and to those profiles which are shown as alternative embodiments in FIGURES 4 to 6. For the sake of simplicity merely the one or the other profile flank is studied for the respective embodiment in FIGURES 1 and 2. Two identical or somewhat different profile flanks may be used simultaneously to form a substantially symmetrical profile which satisfies the requirement for the profile according to the invention.

In FIG. 2 the $Z_1$-profile is formed thereby that to the top circle 21 of the male rotor is connected a selected curve 40 with the function $y_M = f(x_M)$. Said curve extends in FIG. 2 between the points 29 and 28 and is to its major portion formed by a circular arc with radius $R_{30}$ having its centre in the point 31. From the point 28 to the pitch circle 13 of the male rotor with intersection in the point 24, that is along more half the length of lobe flank, the $Z_1$-flank coincides with that line which is generated by the outer point on the groove profile 41 of the female rotor or by the transition point for an outer curve 42 connected to the groove profile of the female rotor.

For the lobe profile according to the invention the generated flank profile $Z_1$ may, under certain conditions which do not correspond to the embodiment shown in FIG. 2, be approximately replaced by a $Z_3$-profile composed of circular arcs, the generated portion between the points 24 and 25 then being substituted by a circular arc which has its centre in the point 26 or in the region around this point and has a radius $R_{27}$. For such an approximate formation of the male lobe profile the circular arc having the reference character $Z_3$ is extended to the intersection with the top circle 21, whereafter another selected curve 40 (not shown for the $Z_3$-profile) is adapted to form a tangent to arc lines crossing each other and so that a rounded shape of the upper top portion of the male lobe 10 is obtained.

As will be seen from FIG. 2 the curve 40 selected for the top portion of the male lobe 10 will coincide in point 28 with that line which is generated by the female lobe 11. For the sake of comparison the extension 44 of the generated line has been extended to the point 32 on the circle 21.

The left portion of the male lobe profile is denoted by $Z_2$. For this profile the generated portion extends over half the length of the profile between the points 23 and 35. At the point 33 the generated line will coincide with a curve 40 chosen for the upper profile flank in accordance with the invention and joining the top circle 21 of the male rotor. In FIG. 2 said curve 40 is approximately substituted by a circular arc having a radius $R_{34}$ and its centre in the point 35. For the sake of comparison the generated portion has been extended with a dotted line 36 and intersects the circle 21 in the point 37.

The ratio $b/h$ is for the profiles $Z_1$, $Z_2$ and $Z_3$ shown, of the order 0.81 to 0.86, all of them falling within the scope of the inventive concept.

In FIG. 3 the known circular arc profile $C_1$ is shown in relation to a male lobe profile formed according to the invention which has a curve 40 joining the top circle 21 and satisfying the function $y_M = f(x_M)$ which is so chosen that it substantially coincides with a line generated by the female lobe and having a ratio $b/h$ equal to 0.96.

In FIGURES 1 to 4 the addendum and dedendum portions shown for the lobes of the respective rotors have been omitted in the other figures in order to simplify the calculations for the various profiles according to the following tabulated values. It should also be pointed out that the profiles shown according to the invention and the profiles of the known types are not shown with those clearances which are required at the machines under consideration, but since the comparing calculations are made under the same assumptions for the various profiles, the Tables I, II and III will give a correct indication of what is gained with the profiles according to the invention in relation to the $C_1$-profile. All examples have the rotor combination of four male lobes and six female lobes.

TABLE I

| Profile | $C_1$ | $Z_2+Z_2$ |
|---|---|---|
| Sealing area between rotors, and between rotors and housing, cm.² | 0.43 / 2.13 | 0.58 / 2.08 |
| Sum of sealing area | 2.56 | 2.66 |
| Blow hole 100/50% | 0.52/0.26 | 0.14/0.07 |
| Sum of blow hole | 3.08/2.82 | ¹ 2.80/2.71 |

¹ = 91/96.5%.

NOTE.—With respect to the greater displacement volume the leakage area will be for $Z_2+Z_2$ 96.5/1.16=83% of leakage area for $C_1$.

TABLE II

| Profile | $C_1$ | $Z_1+Z_2$ | $Z_2+Z_2$ | $Z_3+Z_3$ |
|---|---|---|---|---|
| Outer diam. $2R_y$-male rotor | 200 | 200 | 200 | 200 |
| Outer diam.-female rotor | 200 | 180 | 180 | 180 |
| Addendum | 0 | 0 | 0 | 0 |
| Rotor length | 300 | 300 | 300 | 300 |
| Centre distance between the rotors | 166.6 | 150 | 150 | 150 |
| Wrap angle, male rotor, degrees | 300 | 300 | 300 | 300 |
| Wrap angle, female rotor, degrees | 200 | 200 | 200 | 200 |
| Effective ring area, cm.² | 161.3 | 187 | 187 | 187 |
| Length of sealing line between rotors (one pitch), cm | 21.5 | 31.3 | 29.2 | <29.2 |
| Corresponding area (play 0.2 mm.) | 0.43 | 0.63 | 0.58 | <0.58 |
| Sealing length between rotors and housing, cm | 106.4 | 103.8 | 103.8 | <103.8 |
| Corresponding area, cm.² (clearance or play 0.2 mm.) | 2.13 | 2.08 | 2.08 | 2.08 |
| Area of blow hole, cm.² | 0.52 | 0.02 | 0.14 | >0.14 |
| Displacement volume relative to $C_1$ | 1.0 | 1.16 | 1.16 | 1.16 |
| Calculated leakage loss relative to $C_1$ as screw turbine | 1.0 | 0.8 | 0.81 | |
| Radius ratio $R_1/R_y$ | 0.66 | 0.6 | 0.6 | 0.6 |

TABLE III

| Profile | $C_1$ | $Z_2+Z_2$ | $Z_1+Z_1$ | $Z_4+Z_4$ |
|---|---|---|---|---|
| Blow hole in relation to: | | | | |
| $C_1$ | 100 | 4 | 27 | 64 |
| $B/h$ | 1 | 0.81 | 0.86 | 0.96 |

What is claimed is:

1. A screw rotor machine for compressible fluids comprising a male rotor having substantially symmetrical lobes and cooperating with a female rotor, the male rotor having at least four lobes and the female rotor having at least six lobes, characterized in that the profile of the male lobes has a ratio $b/h$ less than one, where $b$ is the length of the tangent to the pitch circle of the male rotor between the symmetry axis ($x$-axis) of the respective lobe and either of the profile flanks and $h$ is the profile height of the lobes on the respective symmetry axis from the pitch circle of the male rotor, and in that the profiles of cooperating rotors are formed by selecting at least one outwardly convex curve joining the top circle of the male rotor on each side of the $x$-axis of the respective lobe and satisfying the function $y_M = f(x_M)$ wherein $x_M$ is the ordinate respecting the symmetry axis ($x$-axis) of a lobe of said male rotor in a two-dimensional rectangular coordinate system wherein the $x$-axis extends radially along a radius of said male rotor and where $y_M$ is the abscissa respecting the $y$-axis of said two-dimensional rectangular coordinate system of the male rotor having an origin at the geometric center of the male rotor, and in that said curve upon rotation of the rotors has successively generated the groove profile of the female rotor to form a curve satisfying the function $y_F = f(x_F)$ throughout all but two short opposite terminal regions thereof where said groove profile curve of each respective female rotor groove connects to the outer periphery of two adjoining female rotor lobes, $x_F$ being the ordinate respecting the symmetry axis ($x$-axis) of said respective female rotor groove in a two-dimensional rectangular coordinate system wherein the $x$-axis extends radially along a radius of said female rotor and $y_M$ being the abscissa respecting the $y$-axis of said two-dimensional rectangular coordinate system of the female rotor having an origin at the geometric center of the female rotor, each terminal region connection of the respective female rotor groove profile curve to the outer periphery or circumference of the female rotor being by means of a selected outwardly convex curve satisfying the function $y_F = g(x_F)$ each respective leading one of which curved terminal region connection has in turn generated the rest portion of the respective male lobe flank.

2. A screw rotor machine as defined in claim 1, characterized in that the flanks of the male rotor along more than half of their length from the pitch circle of the male rotor substantially coincide with lines which are generated by the outermost extent of the groove profile of the female rotor.

3. A screw rotor machine as defined in claim 1, characterized in that each curved according to said function $y_M = f(x_M)$ top portion of the male lobe profile consists of a curve lying inside of imaginary smooth-curved extensions of the generated lines defining the male lobe flanks out to the top circle of the respective male rotor lobe.

4. A screw rotor machine as defined in claim 1, characterized in that the ratio $b/h$ is between 0.97 and 0.70.

References Cited by the Examiner

UNITED STATES PATENTS

| | | | |
|---|---|---|---|
| 2,325,617 | 8/1943 | Lysholm et al. | 230—143 |
| 2,457,314 | 12/1948 | Lysholm | 230—143 |
| 2,473,234 | 6/1949 | Whitfield | 103—128 |
| 2,486,770 | 11/1949 | Whitfield | 103—128 |
| 2,622,787 | 12/1952 | Nilsson | 230—143 |
| 3,138,110 | 6/1964 | Whitfield | 103—128 |

DONLEY J. STOCKING, *Primary Examiner.*

WILBUR J. GOODLIN, *Examiner.*